United States Patent [19]
Wirt

[11] Patent Number: 5,495,760
[45] Date of Patent: Mar. 5, 1996

[54] BEERMUG GYROSCOPE

[75] Inventor: Thomas M. Wirt, Irvine, Calif.

[73] Assignee: Rockwell International Corporation, Seal Beach, Calif.

[21] Appl. No.: 270,978

[22] Filed: Jul. 5, 1994

[51] Int. Cl.⁶ .................................................. G01P 15/14
[52] U.S. Cl. ............................................................. 73/504.13
[58] Field of Search ...................... 73/504, 505, 517 AV; 74/5.6 R, 5.6 D

[56] References Cited

U.S. PATENT DOCUMENTS

| | | | |
|---|---|---|---|
| 3,182,512 | 5/1965 | Jones | 73/505 |
| 4,655,081 | 4/1987 | Burdess | 73/505 |
| 5,218,867 | 6/1993 | Varnham | 73/505 |

FOREIGN PATENT DOCUMENTS

| | | | |
|---|---|---|---|
| 3181814 | 8/1991 | Japan | 73/505 |
| 2061502 | 5/1981 | United Kingdom | 73/505 |

*Primary Examiner*—Hezron E. Williams
*Assistant Examiner*—Christine K. Oda
*Attorney, Agent, or Firm*—George A. Montanye; Charles T. Silberberg; Tom Streeter

[57] ABSTRACT

A gyroscope includes one or more drive cylinders operatively attached to a pickoff member, which can be in the form of a disk or cylinder. Where the pickoff member is cylindrical, the gyroscope is configured as three axially-aligned cylindrical members attached end to end, the outer two functioning as drive cylinders and the inner one functioning as a pickoff cylinder. The drive cylinders have a single electrode on the outside diameter and a single electrode on the inside diameter. The pickoff cylinder has a single electrode on the outside diameter and a plurality of electrodes on the inside diameter. In the preferred embodiment, the three cylindrical members are integrally formed with one another from piezoelectric material that is polarized radially, and each drive cylinder is attached to the pickoff cylinder by a plurality of connecting members or posts located at the separations between the pickoff electrodes. The posts are preferably staggered positionally as between the two drive cylinders. The drive member or members are electrically driven in alternating radial expansion and contraction.

9 Claims, 4 Drawing Sheets

BEERMUG GYROSCOPE

BACKGROUND OF THE INVENTION

This invention relates to angular rate-sensing devices, and specifically to an improved vibrating circular cylinder design useful in such devices.

The advantages of vibratory gyroscopes over the traditional design based upon a wheel supported in a gimbal are well known.

Numerous designs of vibratory gyroscopes have been produced and/or proposed. These include, among others: the tuning fork (see, for example, U.S. Pat. Nos. 4,524,619 (Reissue No. 32,931) and 4,899,587 to Staudte and U.S. Pat. No. 4,898,032 to Voles); the vibrating shell (e.g., Delco Resonator Gyro Key to New Inertial Systems, *Aviation Week & Space Technology*, (Sep. 30, 1991)); the vibrating beam (e.g., Vibrating Angular Rate Sensor, *Electronics* (June 1968); the vibrating disc (e.g., The Theory of a Piezoelectric Disc Gyroscope, *IEEE Transactions on Aerospace and Electronic Systems* (Vol. AES-22, No. 4, July 1986); and the vibrating cylinder (e.g., The Dynamics of a Thin Piezoelectric Cylinder Gyroscope, *Proc. Instn. Mech, Engrs.* (Vol. 200, No. C4).

The above-referenced Delco Resonator Gyro is a hemispherical resonator gyro that has been nicknamed "the wineglass gyroscope" because of the shape of its resonating element. As described herein, my present invention may correspondingly be nicknamed "the beermug gyroscope".

The "wineglass" and cylinder gyroscopes mentioned above all operate by distorting the sensor from its normally-circular cross section to a shape approaching an oval or an ellipse. The Coriolis effect causes this elliptical pattern to "rotate" about the longitudinal axis of the cylinder/wineglass. The output of the device is measured by detecting this rotation or phase shift.

Although these prior art devices are to some degree functional for their intended purposes, these devices have numerous shortcomings. Among other things, the output from most of the devices is a relatively small scale factor with a large quadrature signal. Those skilled in the art will understand that this yields a large bias instability.

The wineglass gyros can provide good performance (sometimes comparable or perhaps even exceeding the performance characteristics of the present invention), but they typically are very expensive to fabricate, in part because they require tremendous precision during manufacture and assembly.

The present invention, in contrast, has a greatly reduced bias instability with relatively affordable manufacturing costs. The preferred embodiment of the invention utilizes separate drive and pickoff cylinders. The drive mode natural resonant frequency ("NRF") and the pickoff mode NRF are both high Q modes and are slightly separated (in the nominal range of 0.5 to 5%, but not limited to that range). These two different modes have NRFs that are close enough to be strongly coupled, which benefits the pickoff amplitude. Among other things, the strong coupling provides a much larger scale factor and greatly reduces quadrature signal. Certain embodiments of my invention thus provide a relatively high scale factor with a bias stability that is two orders of magnitude smaller than most prior art devices (with the exception of the expensive wineglass gyros, as noted above).

OBJECTS AND ADVANTAGES OF THE INVENTION

It is, therefore, an object of my invention to provide an improved angular rate-sensing device of piezoelectric material, including the combination of one or more hollow cylindrical driving members each operatively attached to a generally circular pickoff member. In the preferred embodiment, the one or more cylindrical driving members and the pickoff member are coaxially aligned along their respective longitudinal axes. Drive electrode means are affixed to the one or more cylindrical driving members for transmitting electrical signals for driving the driving members in alternating radial expansion and contraction, and pickoff electrode means are fixed to the pickoff member for transmitting electrical signals generated in the pickoff member in response to Coriolis-induced distortion thereof.

Another object of my invention is the provision of a sensor of the aforementioned character, in which the pickoff member is of hollow cylindrical configuration, with two drive cylinders attached to it. In this embodiment, the three cylinders are effectively coaxially aligned and attached to each other. The cylinders are dimensioned so that the vibratory dynamics of the two outer drive cylinders effectively counterbalance one another in many ways, permitting nodes to be positioned along the central pickoff cylinder.

An additional object of my invention is the provision of a sensor of the aforementioned character, but in which the pickoff member is of disc-shaped configuration, with either one or two driving cylinders attached to the pickoff disc. In this alternative embodiment, the disc may be hollow or ring-like, and may be formed as a segmented disc with electrodes disposed between the respective segments.

Still another object of my invention is the provision of a vibratory piezoelectric gyroscope, including first and second axially-aligned hollow cylindrical drive members and a hollow cylindrical pickoff member disposed between, coaxially-aligned with, and operatively attached to, the drive members. Drive electrodes are operatively attached to each of the drive members for transmitting electrical signals for driving the driving members in alternating radial expansion and contraction, and pickoff electrodes are operatively attached to the pickoff member for transmitting electrical signals generated in the pickoff member in response to Coriolis-induced distortion thereof. These latter signals are utilized to determine the angular rate being applied to the gyroscope.

A further object of my invention is the provision of a sensor of the aforementioned character, in which the drive members and the pickoff member are integrally formed from piezoelectric material, and a plurality of radially-aligned slots is provided between the pickoff member and each of the drive members. In the preferred embodiment, the slots define a corresponding plurality of connecting members or posts, and the connecting members operatively attach the drive members to the pickoff member. The connecting members are preferably located radially between the pickoff electrodes, and the connecting members are alternatingly staggered in their respective radial positions as between the first and second drive members.

Other objects and advantages of the invention will be apparent from the following specification and the accompanying drawings, which are for the purpose of illustration only.

DESCRIPTION OF PREFERRED EMBODIMENTS

Figure 1:
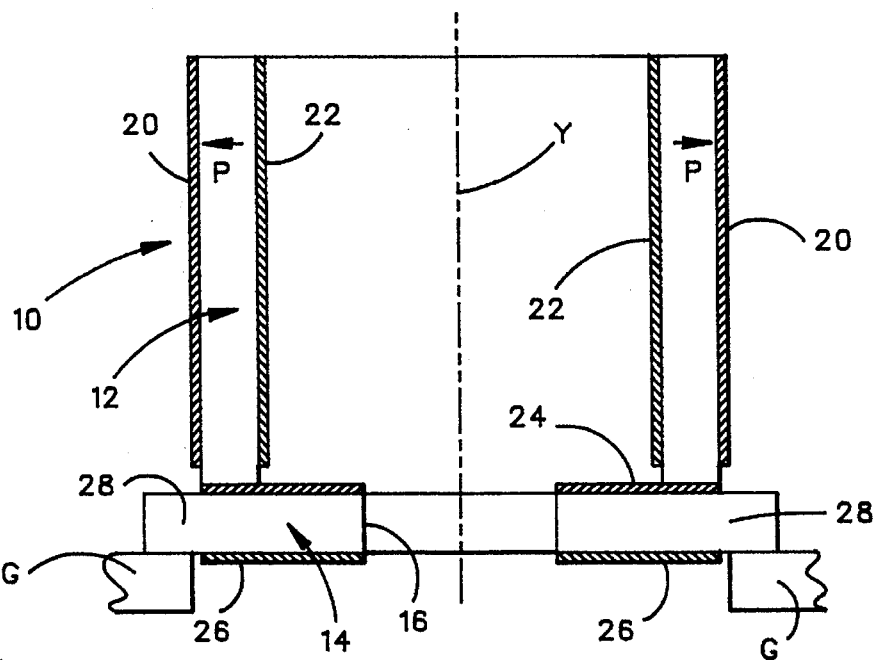
FIG. 1 is a sectional view of a sensor including a single drive member and a disc-like pickoff member (with a central circular opening) similar to the pickoff members illustrated in FIGS. 3 and 4, in accordance with the teachings of the invention.

Referring to the drawings, and particularly to FIG. 1 thereof, I show a preferred embodiment of a gyroscope 10 constructed in accordance with the teachings of the invention. The gyroscope sensor 10 is preferably manufactured from piezoelectric material, by any suitable process. One of the many suitable materials is lead zirconate titanate. Those skilled in the art will understand that suitable methods of manufacture include molding, machining, and similar operations.

The sensor 10 constitutes a cylinder with one end nearly or somewhat closed, having a cylindrical driving member 12 and a disc-like pickoff member 14. In the preferred embodiment, a central circular opening 16 is provided in the pickoff disk 14. Drive electrodes 20 and 22 are mounted on the outer diameter and inner diameter, respectively, of the driving member 12, and the preferred polarization of the driving member 12 is indicated by arrows P. Pickoff and/or polarization electrodes 24, 26, and 28 are mounted on the pickoff member 14.

Figure 3:
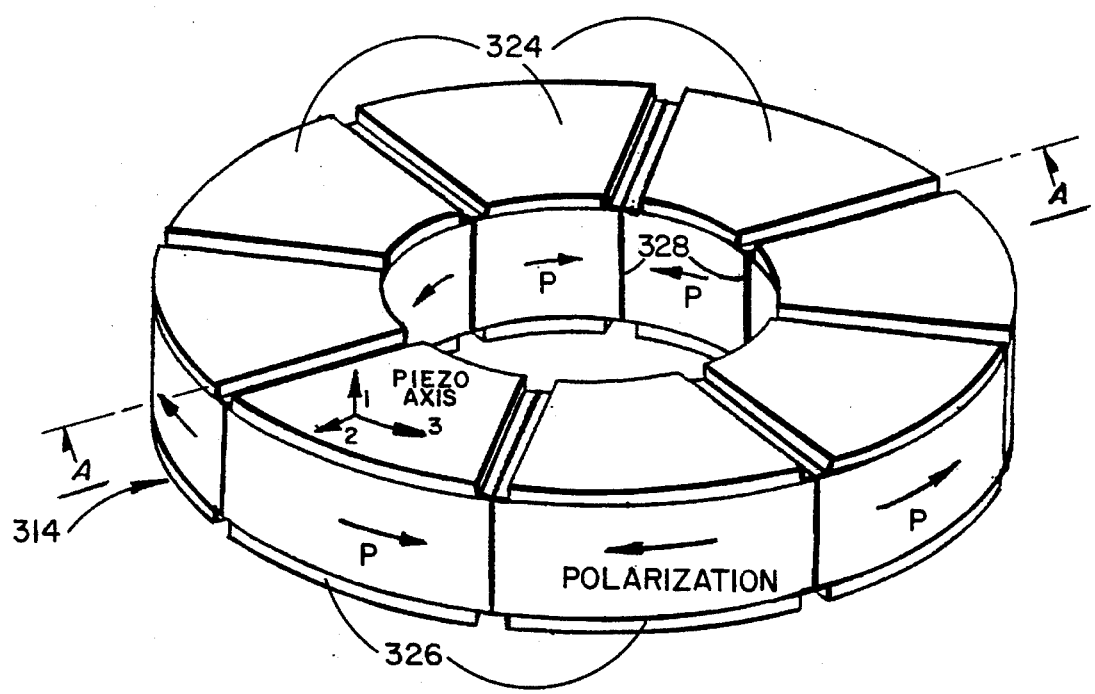
FIG. 3 is an isometric view of an embodiment of a segmented disc-like pickoff member of the invention, illustrating an arrangement of electrodes for angular polarization of the disc.
Figure 4:
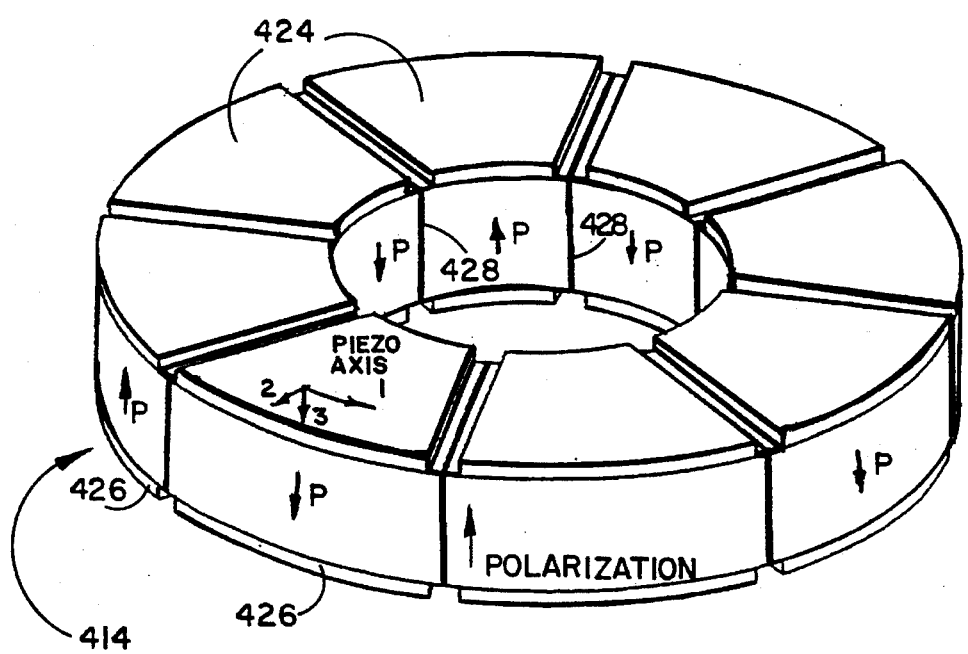
FIG. 4 is an isometric view of an alternative embodiment of a segmented disc-like pickoff member of the invention, illustrating an arrangement of electrodes for axial polarization of the disc.
Figure 5:
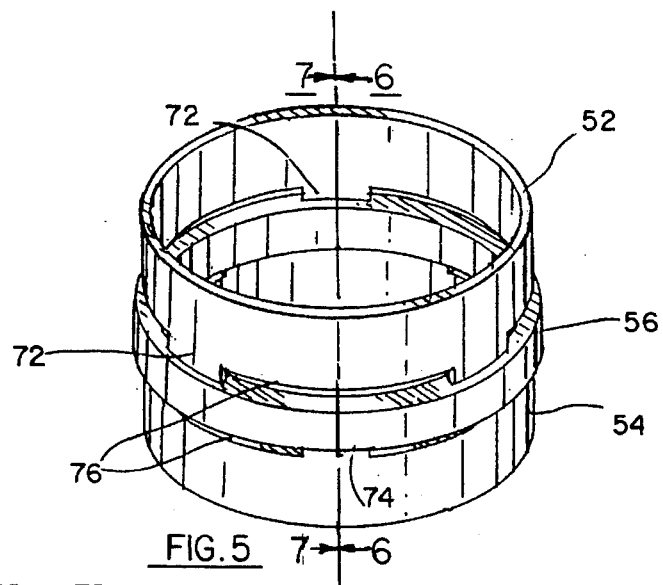
FIG. 5 is an isometric view of another alternative embodiment of a sensor including two drive members and a hollow cylindrical pickoff member, in accordance with the teachings of the invention.
Figures 6, 7:
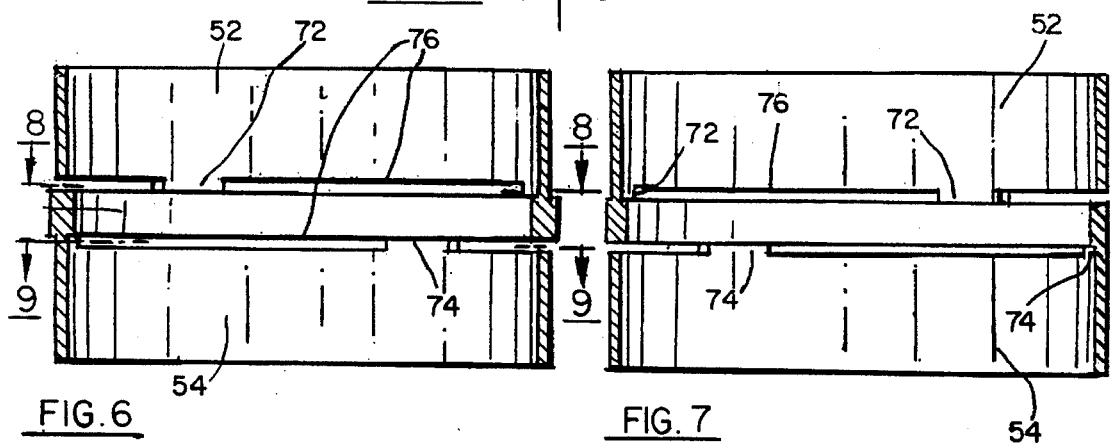
FIG. 6 is a sectional view taken along line 6—6 of FIG. 5.
FIG. 7 is a sectional view taken along line 7—7 of FIG. 5.
Figures 8, 9:
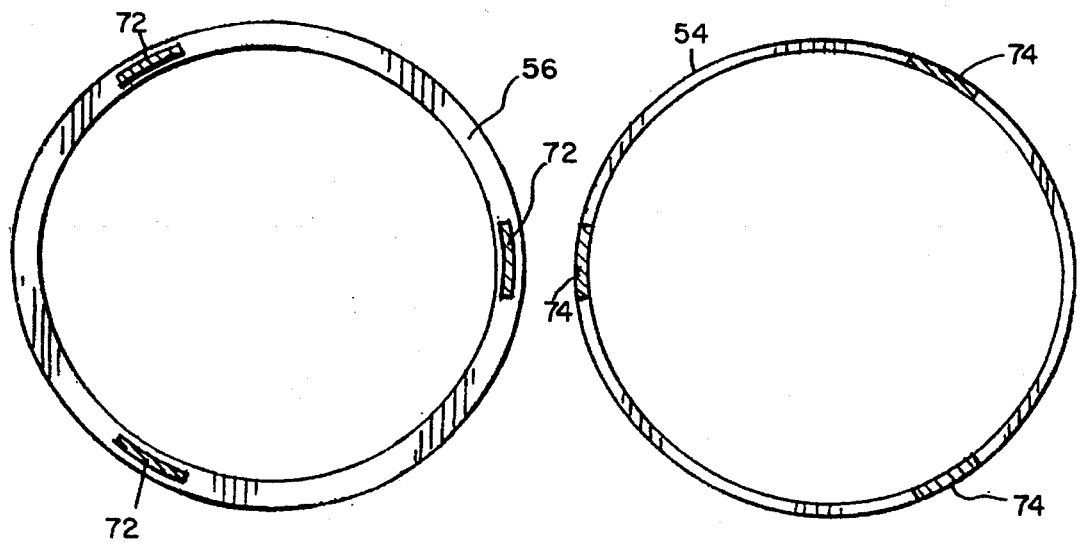
FIG. 8 is a sectional view taken along line 8—8 of FIG. 6.
FIG. 9 is a sectional view taken along line 9—9 of FIG. 6.

Further exemplary details regarding embodiments of the pickoff disk 14 (and especially the electrodes 24, 26 and 28 thereof) are illustrated in FIGS. 3 and 4. Those skilled in the art will understand that the disk 14 may thus be polarized either angularly (FIG. 3) or axially (FIG. 4).

For purposes of clarity, the numbering of the various elements of the embodiments in FIGS. 3 and 4 corresponds to the numbering of the elements in FIG. 1, except that the elements are preceded by a "3" in FIG. 3 and by a "4" in FIG. 4. Thus, disk 14 (FIG. 1) is denominated as disk 314 in FIG. 3 and as disk 414 in FIG. 4.

For angular polarization, electrodes 324 and 326 function as pickoff electrodes, while interspliced electrodes 328 function as polarizing electrodes. The resulting piezo axes are indicated in FIG. 3, as well as the direction of polarization (by arrows P).

For further clarity, a view along line A—A of FIG. 3 would provide the view (with respect to the disk-like member 314) illustrated in FIG. 1. That is, the electrodes 28, FIG. 1, would be exposed by sectioning the disk member 14 along a line such as line A—A in FIG. 3.

The aforementioned alternative of axial polarization is shown in FIG. 4. Electrodes 424 and 426 function as polarizing electrodes, while interspliced electrodes 428 function as pickoff electrodes. The resulting piezo axes are indicated in FIG. 4, as well as the direction of polarization (by arrows P).

As is known to those skilled in the art, the preferred ceramic components (such as the angular segments between which the electrodes 328, FIG. 3, are placed) useful in the present invention can be molded, pressed and fired into the desired shapes by known methods. The various electrodes can be painted onto the ceramic segments and also fired. The desired polarization of the ceramic components may be achieved, for example, by placing high voltage across the ceramic while it is at a high temperature and cooling the ceramic while the voltage is maintained.

In addition, certain embodiments (such as that illustrated in FIGS. 5–11, for example) may be molded as a single integral unit. Where a plurality of ceramic pieces are molded or otherwise utilized, they are preferably bonded or adhered together by any of a variety of suitable known methods.

Figure 2:
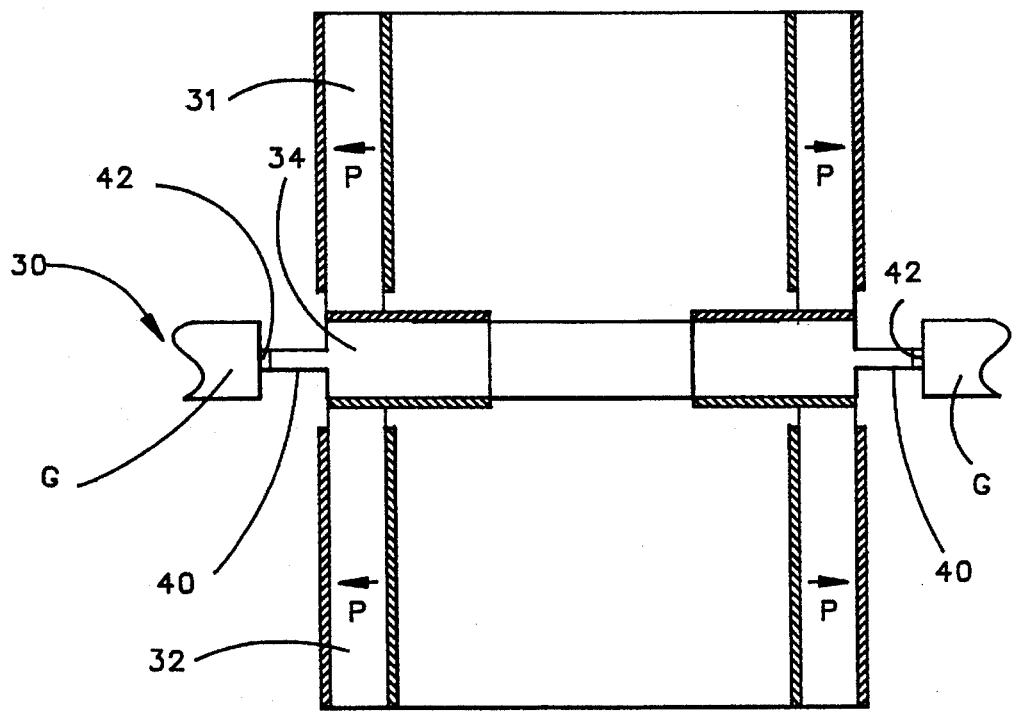
FIG. 2 is a sectional view of an alternative embodiment of a sensor including two drive members and a disc-like pickoff member (similar to the pickoff member of FIG. 1), in accordance with the teachings of the invention.

In the embodiments of FIGS. 1 and 2, the drive cylinders are preferably affixed to the pickoff means by a continuous attachment, such as by the use of a mechanical attachment or a thin layer of "hard-bond" adhesive material. This attachment and/or adhesive differs from the elastomeric adhesive discussed below (as discussed below, the "give" in the elastomeric material is desirable for adhering the gyro to the gyro's case). Any material such as hard epoxy and the like, which has relatively low elasticity, may be utilized to form this "hard-bond". One of the many such suitable hard-bond adhesives is sold as Ablebond 380.

As indicated above, FIGS. 3 and 4 are illustrative of many pickoff disks which may be utilized in connection with the embodiment of FIG. 1 (and FIG. 2, as discussed below). If the cylinder 12 (FIG. 1) is expanded and contracted radially at a given frequency F (for example, by applying an AC voltage to the drive electrodes 20 and 22), then rotating the cylinder about its longitudinal axis Y at some angular rate causes a Coriolis acceleration of the cylinder 12 about the axis. Because the cylinder 12 is mounted to the disk 14 with the bottom of the disk at mechanical ground G, the disk 14 will experience a torque at the frequency F proportional to the angular rate, the driving frequency, the mass of the cylinder 12, the radius of the cylinder, and the amplitude of radial oscillation. This torque results in piezoelectric voltage in the pickoff disk 14, which is sensed and measured by the pickoff electrodes.

If the frequency of the drive voltage is at the radial natural frequency of the cylinder 12, then the radial mode will be amplified by the Q of the material (if there are no external losses) and will be the dominant mode. If the natural frequency of the disk 14 is tuned to the same frequency, the voltage on the disk pickoff electrodes (electrodes 24 and 26, or 28) (which output is the output voltage) is also amplified.

Those skilled in the art will understand that the device of my invention can be made in a wide range of sizes. In general, larger sizes would be easier to manufacture and assemble the electronic components into the device, but smaller sizes would have reduced weight and bulk (which can be important and even critical for certain applications). The precise size to be utilized in any given application must be determined by a balancing of a number of factors such as those just mentioned.

The performance of my invention, as measured by scale factor and bias stability, improves with increasing size. The following table compares scale factor and bias for two sizes, depending on whether one or two drive cylinders is utilized:

| Case outer Diameter | Scale Factor (millivolts/ | Bias Stability (degree/hour) | |
| --- | --- | --- | --- |
| (inches) | degree/sec) | 2-cyl. | 1-cyl. |
| 0.500 | 0.75 | 5.00 | 600 |
| 2.000 | 10.0 | 0.20 | 30 |

The numbers in the preceding table are based on using 10 volts drive, 2.0 percent offset between drive frequency and pickoff frequency, and piezoelectric material catalog number EC-69 from Edo Western Corporation. As indicated elsewhere herein, the device of my invention can be practiced with efficacy with a wide variety of other materials and parameters other than those just-listed.

By exemplary comparison, prior art devices with a case outer diameter of 1 inch can have a scale factor of 14.0 millivolts per degree per second and a bias instability of 1800 degrees/hour [see, for example, D. Harris, "Start—A New Technology Angular Rate Sensor", *Joint Services Data Exchange for Guidance, Navigation and Control*, Oct. 26, 1992, pp. 324, 328].

By adding a second cylinder to the bottom of the disk in the alternative embodiment 30 of FIG. 2, the scale factor is doubled, but the primary advantage is that the torque input to the disk is counterbalanced, the quadrature signal is reduced to the order of 10 degree/hour, and the cross-talk between three such gyros on an instrument cluster is greatly reduced, thereby improving the gyros' performance. Those skilled in the art will understand that the gyro of FIG. 2 consists broadly of two drive cylinders 31 and 32 operatively attached to a pickoff disk 34, which is mechanically grounded at its periphery to ground G (such as the gyro case) at connecting points 40. As discussed elsewhere herein, in the preferred method of assembly, the connecting points 40 are attached to the ground G by a thin layer of elastomeric adhesive 42. Other than the presence of the additional drive cylinder 32 and its associated electrodes, the function, structure and operation of the sensor is virtually identical to that of sensor 10 in FIG. 1.

Among other things, when the drive cylinder or cylinders are vibrating radially by application of appropriate frequencies result and when external rotational forces are applied, axial Coriolis-induced vibratory forces (that is, forces vibrating the disc about the Y-axis) cause shear stress in the pickoff disc 14/34. The pickoff electrodes on the pickoff disc 14 (FIG. 1) or 34 (FIG. 2) sense the voltage that results from that shear stress, which voltage becomes the output of the pickoff disc and the "measurement" sensed by the gyroscopic sensing device.

Those skilled in the art will understand that there are at least two ways to configure the drive cylinder(s): (1) radial polarization and electrodes (illustrated in FIGS. 1, 2, 10 and 11); and (2) angular polarization and electrodes (not shown).

The radial version is by far the simpler and more practical to fabricate. In order to provide angularly polarized drive cylinders, those cylinders would have to be segmented (similar to the segmentation shown in FIGS. 3 and 4 for the pickoff means). This would not be practical because, among other things, the length (or height) of the drive cylinder is large relative to its wall thickness; in other words, the slenderness ratio of the drive cylinders is such that the walls would be too fragile for "segmented" construction.

Those skilled in the art will also understand that there are many ways to configure the pickoff disk. Among these are: angular polarization with axial electrodes (see FIG. 3); axial polarization with angular electrodes (see FIG. 4); and as a third cylinder coupled to two opposing drive cylinders (see FIGS. 5–11). In this third configuration 50, FIGS. 5–11, the opposing torques from the two drive cylinders 52 and 54 cause the walls of the pickoff cylinder 56 to extend and compress angularly and produce a piezoelectric voltage across the cylinder walls. This voltage is measured by the pickoff electrodes 60 and 62, FIG. 10.

As with the previous embodiments, the "three cylinder unit" 50 is made of a piezoelectric material (one of the many suitable materials is lead zirconate titanate) and is polarized radially. An exemplary method of fabricating the unit 50 is to mold it as a single contiguous piece of piezoelectric ceramic. Alternative methods of manufacture would include machining the unit from a solid piece of material, using borers, drills, lasers and/or other cutting tools. Those skilled in the art will understand that other methods of fabrication may alternatively be utilized, and that the unit 50 may even be constructed by assembling three separate cylinders to each other.

As indicated above, if a voltage is applied from the inner electrode to the outer electrode of the drive cylinders 52 and 54, the cylinders will expand or contract, depending on the voltage polarity. The expansion/contraction will occur to the radius, length, and thickness of the cylinders 52 and 54, with the thickness mode expanding when the other two modes contract (and vice versa). Each of the three modes (radial, length, thickness) has its own natural frequency of oscillation which is dependent on the dimensions of the cylinder. If the frequency of the drive voltage is at the radial natural frequency, then the radial mode will be amplified by the Q of the material (if there are no external losses) and will be the dominant mode.

If the drive cylinders 52 and 54 are caused to expand and contract radially at their natural frequencies, an angular rate about the center of those cylinders will create a torque at that frequency. That torque is transferred to the pickoff cylinder 56 via the connecting members 70 such as posts 72 and 74. In the illustrated embodiment, there are three posts 72 between the first drive cylinder 52 and the pickoff cylinder 56, and three posts 74 between the second drive cylinder 54 and the pickoff cylinder 56. The posts 72 and 74 are preferably located at the separations of the pickoff electrodes 60, FIG. 10, and are staggered or alternated with respect to one another's radial position. The posts 72 and 74 may be fabricated by cutting radially-aligned slots 76 in an integral piece of piezoelectric material.

The number, size and positioning of the posts 72 and 74 can be any of a variety of combinations, depending on factors such as the size of the cylinders, the materials from which they are fabricated, etc. For example, six posts 72 staggered with respect to six posts 74 can be beneficially utilized. In any embodiment of the invention, the posts should be of sufficient number and of appropriate spacing to prevent undesirable radial bending of any of the "free arcs" of the pickoff cylinder 56. In other words, the length of any portion of cylinder 56 between adjacent posts 72 and 74 must not be "too long". Persons of ordinary skill in the art will appreciate that such bending could distort the measurement of the pickoff electrodes. The size (including the length, breadth and height) of the posts 72 and 74 must be such as to help make the NRF of the pickoff mode nominally the same as the NRF of the drive mode.

Figure 10:
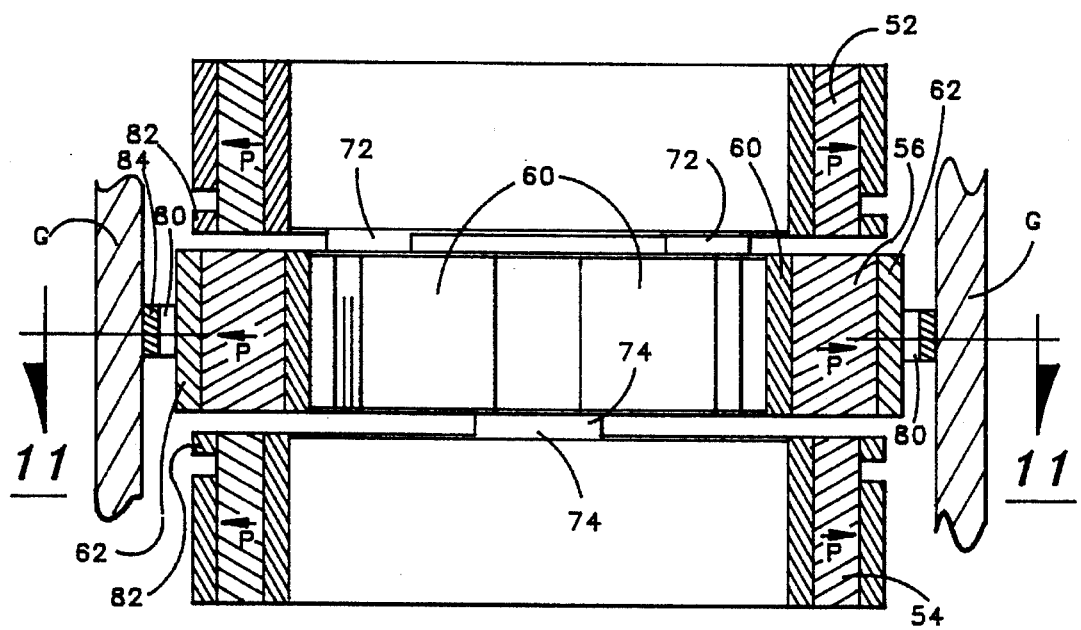
FIG. 10 is a sectional view similar to FIGS. 6 and 7, but illustrating the location and nature of a preferred arrangement of electrodes.
Figure 11:
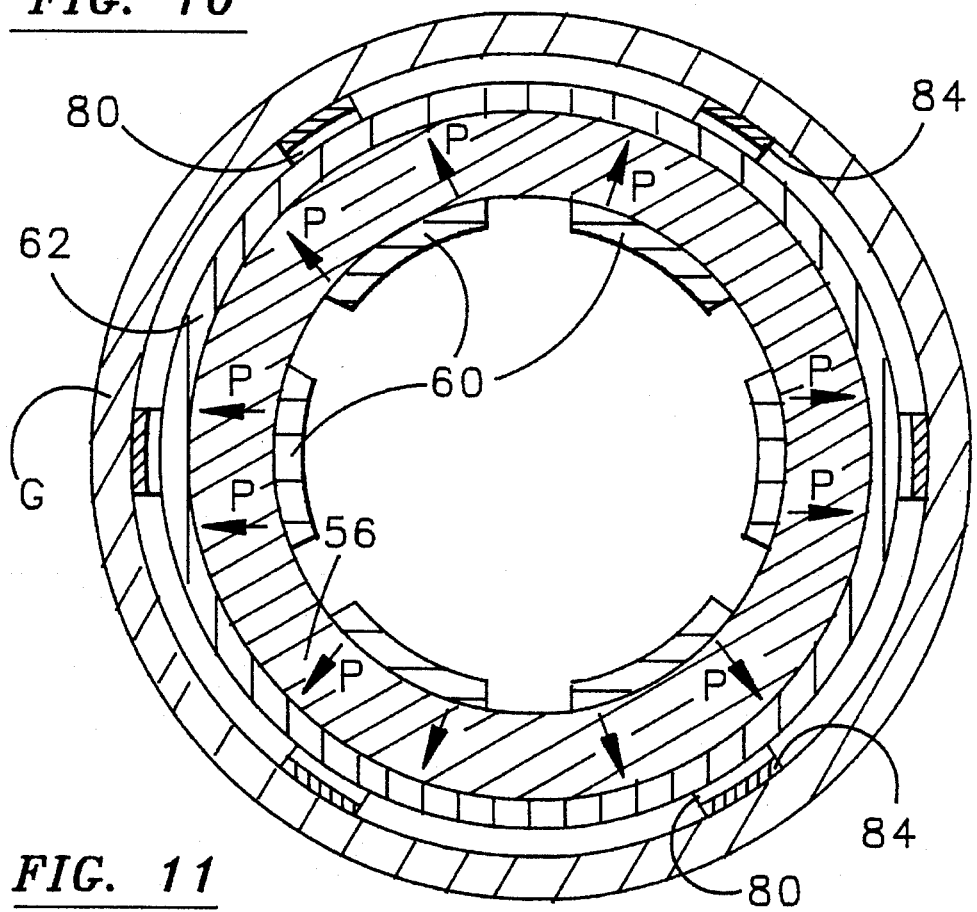
FIG. 11 is a sectional view taken along line 11—11 of FIG. 10.

The positioning of the drive and pickoff electrodes for the embodiment of FIGS. 5-11 is illustrated in FIGS. 10 and 11. Because of the equal and opposite torque from the two drive cylinders, non-vibrating nodes are created at the center of the six pickoff electrodes 60. Protrusions 80 are preferably fabricated on, or are otherwise affixed to, the outer diameter of the pickoff cylinder 56 at these nodes. The gyro is mechanically attached (by any of various known expedients) to the gyro case G at these protrusions 80 on the pickoff cylinder. Those skilled in the art will understand that these mechanical grounds are thus accomplished without creating any damping of the radial or torsional oscillations, and consequently without any associated negative impact on the performance of the gyro 50.

The preferred polarization of the drive and pickoff cylinders 52, 54 and 56 is illustrated in FIGS. 10 and 11 by arrows P.

Preferably, and as indicated above, the attachment of the gyro 50 to its case (see discussion of case G below in connection with FIGS. 10 and 11) is accomplished with an elastomeric adhesive material 84, FIGS. 10 and 11. One example of the many suitable materials for this purpose is Ablebond 724 in a layer approximately 0.010 to 0.012 inches thick. The elastomeric material provides strain relief from the differential expansion caused by any small mismatch in the coefficients of expansion between the case and the piezoelectric ceramic pickoff disk or cylinder.

The gyro case is commonly fabricated from invar, a specialized metal alloy that has a relatively low coefficient of expansion. In order to assemble the gyro 50 to its case, the gyro is preferably slightly smaller than the opening in the case into which the gyro is placed (were it otherwise, it would obviously be very difficult or impossible to assemble the delicate components). Although the preferred piezoelectric material of the gyro 50 also has a relatively low coefficient of expansion in comparison to most materials, it is not likely that the invar case and the gyro will have the identical coefficient of expansion. As indicated above, the adhesive material provides the necessary flexibility to maintain the gyro 50 in its desired relationship with the case.

As indicated above, the mechanical grounding of the gyro to its case preferably is located at points on the gyro that are not vibrating. The preferred method of attachment includes using the aforementioned elastomeric adhesive material to bond the gyro case to each of the attachment points such as nodes 80, regardless of the configuration of the pickoff means (whether, for example, embodiments such as those shown in FIGS. 1, 2, or 5-11 are utilized). The elastomeric material must, of course, be a compromise between stiff and compliant: it must be stiff enough to prevent undesirable loss of Q, drive amplitude and pickoff signal, but also must be compliant enough to avoid thermal distortion.

The preferred gyro case for the gyro 50, FIGS. 5-11, is illustrated in FIGS. 10 and 11 as case G, and is preferably cylindrical and oriented coaxially with the gyro 50. To facilitate assembly where the gyro and case are manufactured separately, the case has an inside diameter that is slightly larger than the outside diameter of the attachment points 80. In addition, and as indicated above, the case preferably has a coefficient of expansion that is at least close to that of the pickoff cylinder 56, so as to minimize the degree of expanding and contracting required by the joint formed by the elastomeric bonding material.

The embodiment of FIG. 10 further preferably includes drive trim electrodes 82. These electrodes can be utilized in the 2-drive-cylinder embodiments of the invention to balance the drive of the two cylinders, and thereby adjust or fine tune the performance of the gyro by reducing the quadrature. Those skilled in the art are aware that quadrature is a primary source of bias instability.

If the two drive cylinders 52 and 54 are driven 180 degrees out of phase with each other, the angular input rate will create torques with opposite polarities on opposite ends (the "top" and "bottom" of the cylinder as viewed in FIG. 6) of the pickoff cylinder 56. These torques will create tension and compressive stresses in the electrode areas of the pickoff with adjacent electrodes having stresses of the opposite polarity. The effect of these stresses acting through the piezoelectric properties of the material creates voltages on the pickoff electrodes 60 proportional to the stresses. The net effect is that adjacent electrodes have nominally equal and opposite voltages, each proportional to the angular input rate.

In the above-described embodiment 50 of three axially-aligned cylindrical members attached end to end, the drive cylinders preferably each have a single electrode on the outside diameter and a single electrode on the inside diameter. The pickoff cylinder 56 has a single electrode 62 on the outside diameter and a plurality of electrodes 60 on the inside diameter. Preferably, the outer electrodes of the drive cylinders are used to provide the drive voltage and the inner electrodes for the ground, with a reversed arrangement for the pickoff cylinder (inner electrodes for sensing output voltage, outer for ground). This further reduces the capacitive coupling of pickoff to drive voltage.

Thus, by my invention, I provide a relatively simple and inexpensive construction of an improved angular rate-sensing device, which operates by radially expanding and contracting one or more piezoelectric drive members.

The sensor and method of my invention have been described with some particularity but the specific designs, constructions and methods disclosed are not to be taken as delimiting of the invention in that various modifications will at once make themselves apparent to those of ordinary skill in the art, all of which will not depart from the essence of the invention and all such changes and modifications are intended to be encompassed within the appended claims.

I claim:

1. In a gyroscopic sensor of piezoelectric material, the combination of:

(a) at least one hollow cylindrical driving member;

(b) a pickoff member of generally circular configuration operatively attached to each said driving member, each said driving member and pickoff member being coaxially aligned along their respective longitudinal axes;

(c) drive electrode means fixed to each said cylindrical driving member for transmitting electrical signals for driving said driving member in alternating radial expansion and contraction, said drive electrode means being constituted by a single electrode on an inner diameter of each said hollow cylindrical driving member and a single electrode on an outer diameter of each said hollow cylindrical driving member; and (d) pickoff electrode means fixed to each said pickoff member for transmitting electrical signals generated in said pickoff member in response to Coriolis-induced distortion thereof.

2. The sensor of claim 1, in which said pickoff member is of hollow cylindrical configuration.

3. The sensor of claim 1, in which said pickoff member is of segmented disc-shaped configuration.

4. A vibratory piezoelectric gyroscope, including: first and second axially-aligned hollow cylindrical drive members; a hollow cylindrical pickoff member disposed between, coaxially-aligned with, and operatively attached to, said drive members; drive electrodes operatively attached to said drive members for transmitting electrical signals for driving said driving members in alternating radial expansion and contraction; and pickoff electrodes operatively attached to said pickoff member for transmitting electrical signals generated in said pickoff member in response to Coriolis-induced distortion thereof.

5. The gyroscope of claim 4, in which said pickoff electrodes include a single electrode on the outside diameter of said pickoff member and a plurality of electrodes on the inside diameter of said pickoff member.

6. The gyroscope of claim 4, in which said drive electrodes include a single electrode on the outside diameter of each said drive members and a single electrode on the inside diameter of each said drive members.

7. The gyroscope of claim 4 or claim 5 or claim 6, in which said drive members and said pickoff member are integrally formed from piezoelectric material, and a plurality of radially-aligned slots is provided between said pickoff member and each of said drive members, said slots defining a corresponding plurality of connecting members of piezoelectric material, said connecting members constituting said operative attachment of said drive members to said pickoff member.

8. The gyroscope of claim 7, in which said connecting members are radially located between said pickoff electrodes.

9. The gyroscope of claim 7, in which said connecting members are alternatingly staggered in their respective radial positions as between said first and second drive members.

* * * * *